United States Patent
Yasuda

(10) Patent No.: US 8,251,439 B2
(45) Date of Patent: Aug. 28, 2012

(54) VEHICLE BODY

(75) Inventor: Koji Yasuda, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 260 days.

(21) Appl. No.: 12/671,718

(22) PCT Filed: Aug. 5, 2008

(86) PCT No.: PCT/JP2008/002112
§ 371 (c)(1),
(2), (4) Date: Feb. 2, 2010

(87) PCT Pub. No.: WO2009/031264
PCT Pub. Date: Mar. 12, 2009

(65) Prior Publication Data
US 2011/0227370 A1   Sep. 22, 2011

(30) Foreign Application Priority Data

Sep. 7, 2007  (JP) ................................. 2007-232733

(51) Int. Cl.
*B60J 7/00* (2006.01)

(52) U.S. Cl. ................................. 296/193.06

(58) Field of Classification Search ............. 296/193.06, 296/146.5, 146.6, 193.05, 224; 49/502; 180/69.21; 280/727, 801.1, 801.2, 802, 803, 807, 808
See application file for complete search history.

(56) References Cited

U.S. PATENT DOCUMENTS

| | | | | |
|---|---|---|---|---|
| 2,508,124 A | * | 5/1950 | Stephenson | 220/86.2 |
| 3,159,409 A | * | 12/1964 | Koehler | 280/830 |
| 4,079,952 A | * | 3/1978 | Nishio et al. | 280/834 |
| 4,252,245 A | * | 2/1981 | Kudo | 220/86.2 |
| 4,573,694 A | * | 3/1986 | Goto et al. | 280/834 |
| 5,118,155 A | * | 6/1992 | Koop | 296/1.06 |
| 6,033,006 A | * | 3/2000 | Bovellan et al. | 296/97.22 |
| 6,305,408 B1 | * | 10/2001 | Goto et al. | 137/351 |
| 6,435,233 B1 | * | 8/2002 | Miura et al. | 141/390 |
| 6,508,501 B1 | * | 1/2003 | Meinke | 296/97.22 |
| 7,198,078 B2 | * | 4/2007 | Miura et al. | 141/286 |
| 7,390,048 B2 | * | 6/2008 | Yoshimura | 296/97.22 |

FOREIGN PATENT DOCUMENTS

| | | |
|---|---|---|
| DE | 10 2005 017 981 A1 | 11/2006 |
| EP | 1 118 528 A2 | 7/2001 |
| JP | 62-139719 U | 9/1987 |
| JP | 63-23216 U | 2/1988 |
| JP | 63-23216 Y2 | 6/1988 |
| JP | 63-180327 U | 11/1988 |
| JP | 6-286655 A | 10/1994 |
| JP | 9-109701 A | 4/1997 |
| JP | 11-189051 A | 7/1999 |
| KR | 1998-055268 A | 9/1998 |

* cited by examiner

*Primary Examiner* — Kiran B Patel
(74) *Attorney, Agent, or Firm* — Foley & Lardner LLP

(57) ABSTRACT

There is a pit-defining (17) housing in a vehicle pillar in a spaced relationship with a vehicle inner panel assembly. A load-transferring element includes an anchor plate (27a) attached to the vehicle inner panel assembly and arms (27b, 27c) extending away from the anchor plate. Each of the arms (27b, 27c) is joined to one of sidewalls (17b, 17c) of the pit-defining housing at that area region which extends inwardly from a terminal end (27bT, 27cT) of the arm along an inside of the arm.

7 Claims, 5 Drawing Sheets

VEHICLE BODY

TECHNICAL FIELD

The present invention relates to a vehicle body, and more particularly to a vehicle body comprising an energy-input interface in a vehicle pillar.

BACKGROUND ART

The vehicle body of the above kind is known from JP second (examined) publication of Utility Model No. 63 (1988)-023216.

DISCLOSURE OF INVENTION

Technical Problem

In the known vehicle body whose load bearing pillars are arranged in the neighborhood of the backrest of a driver or passenger seat ("B pillars"), an outer panel of one of the vehicle pillars includes a region configured to define a pit, the bottom of which is formed with a port. Extending through the port is a fuel pipe with a fuel cap. High side impact stability is required in order, in the event of a side impact, to be able to ensure the safety of the vehicle occupants. When a force is applied that is greater than the configuration of the region of the outer panel may withstand in the case of a side collision, this region may trigger undesired deformation of the vehicle pillar. Accordingly, a need remains for controlling the undesired deformation of the vehicle pillar.

An object of the present invention is to provide a vehicle body that meets the above-mentioned need.

Technical Solution

According to the present invention, there is provided a vehicle body comprising: a vehicle pillar; a vehicle inner panel assembly; a pit-defining housing in the vehicle pillar in a spaced relationship with the vehicle inner panel assembly; and a load-transferring element including an anchor plate attached to the vehicle inner panel assembly and arms extending away from the anchor plate, each of the arms being joined to one of sidewalls of the pit-defining housing at that area region which extends inwardly from a terminal end of the arm along an inside of the arm.

Advantageous Effects

When a force is applied to the pit-defining housing in the event of a side collision, the transmission of impact load to the vehicle inner panel assembly from the pit-defining housing is carried out efficiently via engagement between the sidewalls of the pit-defining housing and the arms of the load-transferring element, causing the impact load to disperse over the whole of the vehicle pillar. Thus, the buckling of the pit-defining housing and the undesired deformation of the vehicle pillar are prevented or at least minimized.

BEST MODE FOR CARRYING OUT THE INVENTION

Initially it is noted that the drawings referred to hereinafter as illustrating the preferred embodiment of the present invention are not to scale and are schematic in nature and, therefore, should not be taken too literally. Nevertheless, the drawings illustrate the invention sufficiently to enable one skilled in the art to practice the invention.

Figure 1:
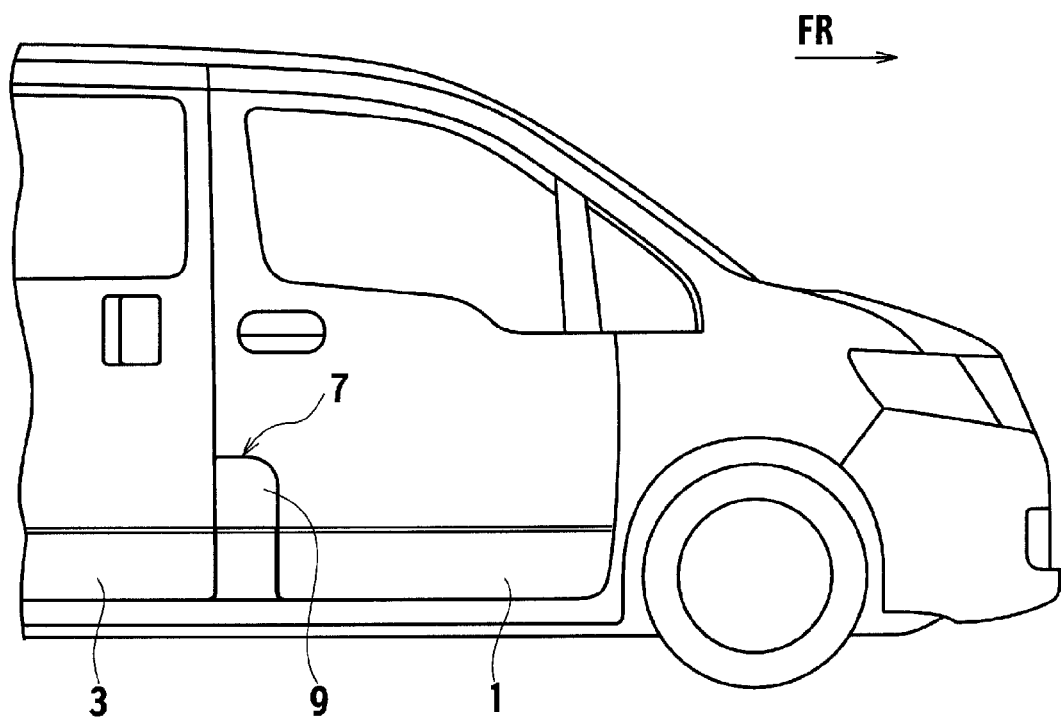
FIG. 1 is a schematic partial side view of a portion of the exterior of a vehicle showing an energy-input interface with a lid closed.

With reference to FIGS. 1-5, an arrow FR indicates a forward traveling direction of a vehicle, in particular a fuel-powered car or a battery-powered car or a hybrid car. The vehicle body has a vehicle pillar on each side of the vehicle. The vehicle pillars are used, for example, as B pillars of a car. In FIGS. 2-5, the vehicle pillar on the right side of the vehicle is indicated at 5. In FIG. 1, the vehicle body has a front door 1 and a rear door 3 on the right side of the vehicle. When the front and rear doors 1 and 3 are closed as shown in FIG. 1, the rearward edge of the front door 1 partially overlaps the vehicle pillar 5 and the forward edge of the rear door 3 engages with the vehicle pillar 5.

Figure 2:
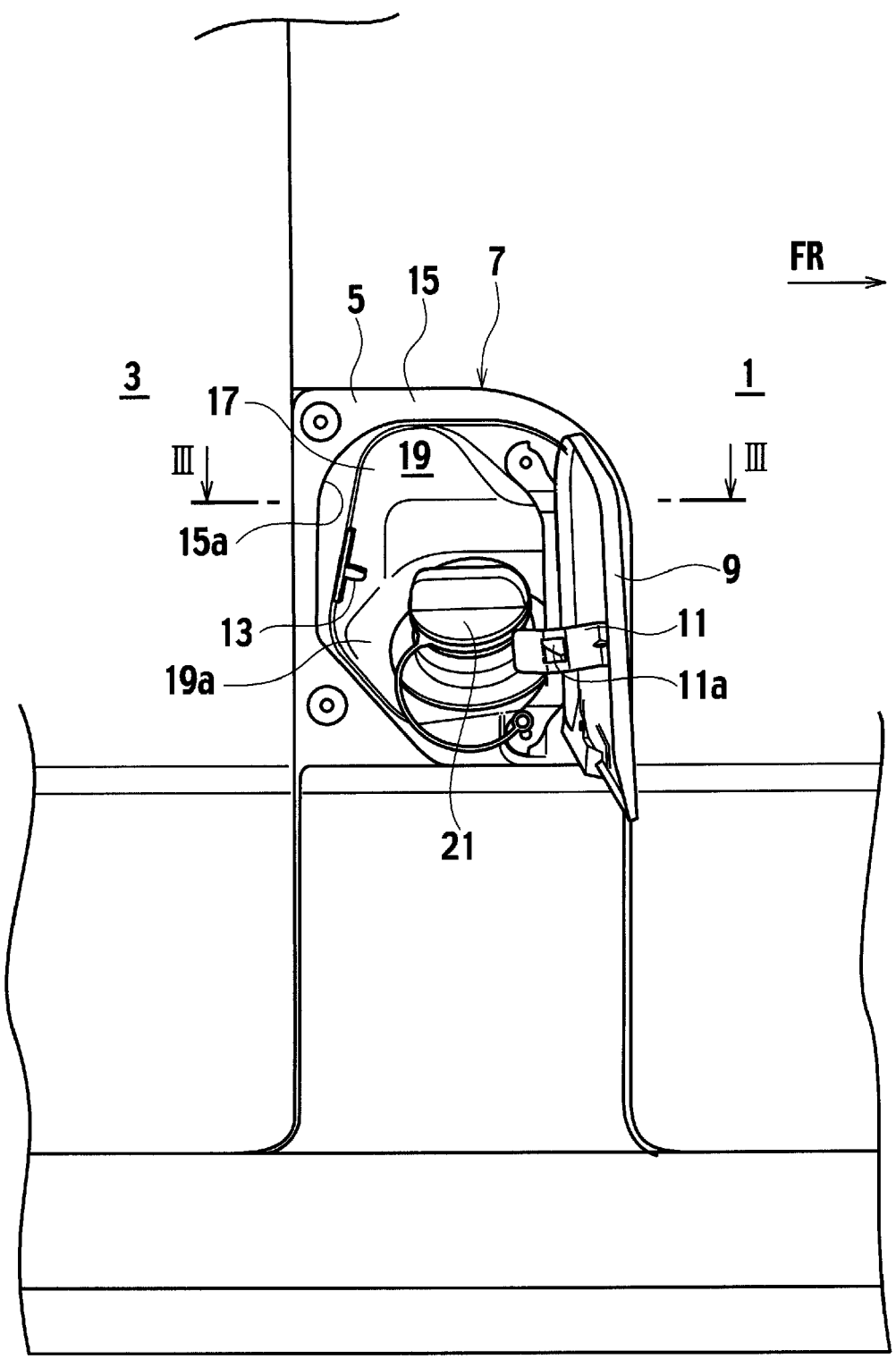
FIG. 2 is a schematic enlarged view of the energy-input interface shown in FIG. 1 with the lid opened.

With reference to FIG. 1, a lower portion of the vehicle pillar 5 is set for an energy-input interface 7. The energy-input interface 7 includes a lid 9. As shown in FIG. 2, a vehicle outer panel 15 of the vehicle pillar 5 is uncovered when the lid 9 is opened. The vehicle outer panel 15 is formed with a lid opening 15a. Through this lid opening 15a, one can access a cap 21 in a pit 19 of a pit-defining housing 17. The cap 21 closes a fuel pipe extending into the pit 19 through an inlet port 19b drilled through a bottom 19a of the pit 19 (see FIG. 3).

As best seen in FIG. 2, the lid 9 is hinged or pivoted to the pit housing 17. When the lid 9 is closed, a lock bolt 13 enters a lock opening 11a of a lock piece 11 to lock the lid 9. The lock bolt 13 is secured to the pit-defining housing 17 and the lock piece 11 is secured to a portion of the lid 9 near its peripheral edge.

Figure 3:
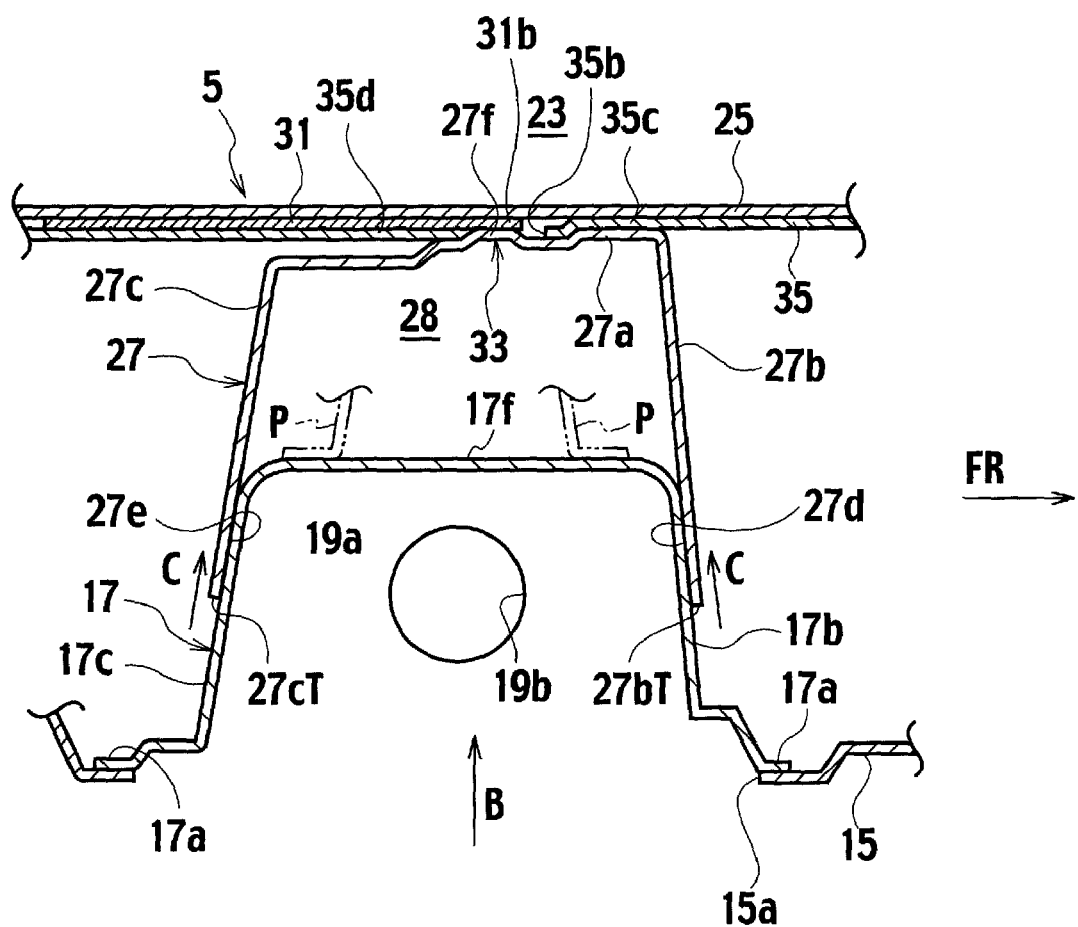
FIG. 3 is a schematic cross sectional view taken through the line III-III in FIG. 2 with unnecessary parts removed from a pit-defining housing to show an inlet port drilled through a bottom of the pit.

With reference to FIGS. 2 and 3, the lid opening 15a is formed through that portion of the vehicle outer panel 15 which covers the energy-input interface 7. The pit-defining housing 17 is disposed in the vehicle pillar 5 behind the lid opening 15a.

In FIG. 3, the schematic cross sectional view has been drawn with the lid 9 removed. As readily seen from FIG. 3, the pit-defining housing 17 defines the pit 19 of the exterior surface of the vehicle body. At a flange 17a around the entry of the pit 19, the pit-defining housing 17 is attached to that area portion of the interior surface of the vehicle outer panel 15 which surrounds the lid opening 15a.

Figure 4:
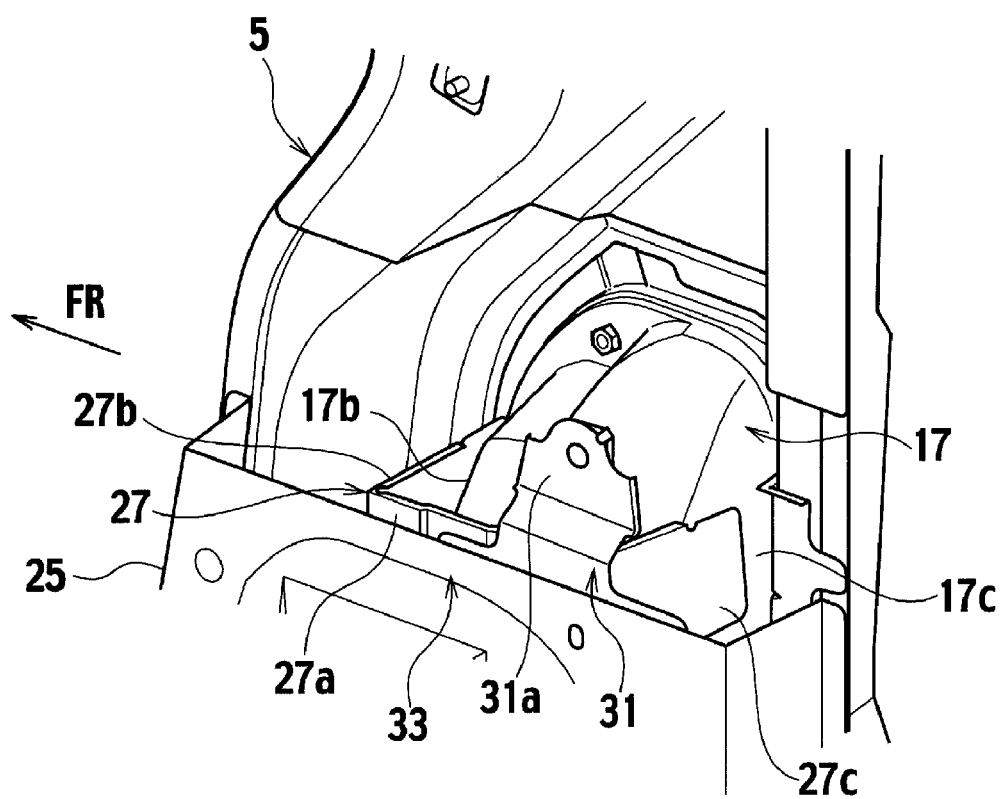
FIG. 4 is a schematic partial perspective view of a portion of the interior of the vehicle with an upper inner panel of a vehicle inner panel assembly removed to show the energy-input interface.

FIG. 4 is a perspective view, viewing from a passenger compartment 23 (see FIG. 3), showing the internal structure of the vehicle pillar 5. In this perspective view, unnecessary parts are removed to show the pit-defining housing 17. As shown in FIG. 4, the pit-defining housing 17 expands toward the passenger compartment 23. The pit-defining housing 17 has interior walls defining the pit 19 (see FIGS. 2 and 3) and exterior walls defining its outward appearance. The exterior walls include a fore sidewall 17b, an aft sidewall 17c, and an end wall 17f (see FIGS. 3 and 4).

As best seen in FIG. 3, the pit-defining housing 17 is in the vehicle pillar 5 in a spaced relationship with the vehicle inner panel assembly that includes a lower inner panel 25 and an upper inner panel 35. Between the pit-defining housing 17 and the lower inner panel 25 is a load-transferring element 27 in the form of a bracket.

The load-transferring bracket 27 comprises several segments which may be constructed out of a continuous sheet of material such as a metal, plastic, or other material shaped to form the bracket 27. Alternatively, the bracket 27 may be constructed of multiple components produced separately and later joined to each other to produce the bracket 27.

In the embodiment of the invention, the bracket 27 includes an anchor plate 27a that is attached to the vehicle inner panel assembly 25, 35. The anchor plate 27a is continuous with a fore extension arm 27b and also with an aft extension arm 27c. In FIG. 3, the fore and aft extension arms 27b and 27c are shown to extend away from the anchor plate 27a. Each of the arms 27b and 27c extends away from the anchor plate 27a in non-perpendicular fashion. In alternative bracket, each of the arms 27b and 27c may do so in a substantially perpendicular angle. The length of the arms 27b and 27c may be varied according to the size and available volume of a specified vehicle pillar 5 to provide a bracket 27 capable of being mounted within the pillar 5.

Each of the extension arms 27b and 27c is joined to one of the sidewalls 17b and 17c of the pit-defining housing 17 at that area region 27d or 27e which extends inwardly from a terminal end 27bT or 27cT of the arm 27b or 27c along an inside of the arm 27b or 27c. In FIG. 3, the fore extension arm 27b overlaps a portion of the fore sidewall 17b of the pit-defining housing 17. The fore extension arm 27b is joined to the fore sidewall 17b at that area region 27d which extends inwardly from the terminal end 27bT along the inside of the arm 27b. The aft extension arm 27c overlaps a portion of the aft sidewall 17c. The aft extension arm 27c is joined to the aft sidewall 17b at that area region 27e which extends inwardly from the terminal end 27cT along the inside of the arm 27c.

Viewing the bracket 27 in the plan view as shown in FIG. 3, the extension arms 27b and 27c extend away from the anchor plate 27a to provide a U-character form. With a gap 28 between the end wall 17f and the anchor plate 27a, the bracket 27 interposes the sidewalls 17b and 17c of the pit-defining housing 17 between its arms 27b and 27c.

With reference to FIGS. 3 and 4, a retractor mounting bracket 31 is positioned between the lower inner panel 25 and the load-transferring bracket 27. The mounting bracket 31 is used to mount a seat belt retractor 29 to the lower inner panel 25 to be described later with reference to FIG. 5. The three parts, namely, the lower inner panel 25, the mounting bracket 31 and the anchor plate 27a of the bracket 27, are joined together by spot welding to produce a catch 33.

Figure 5:
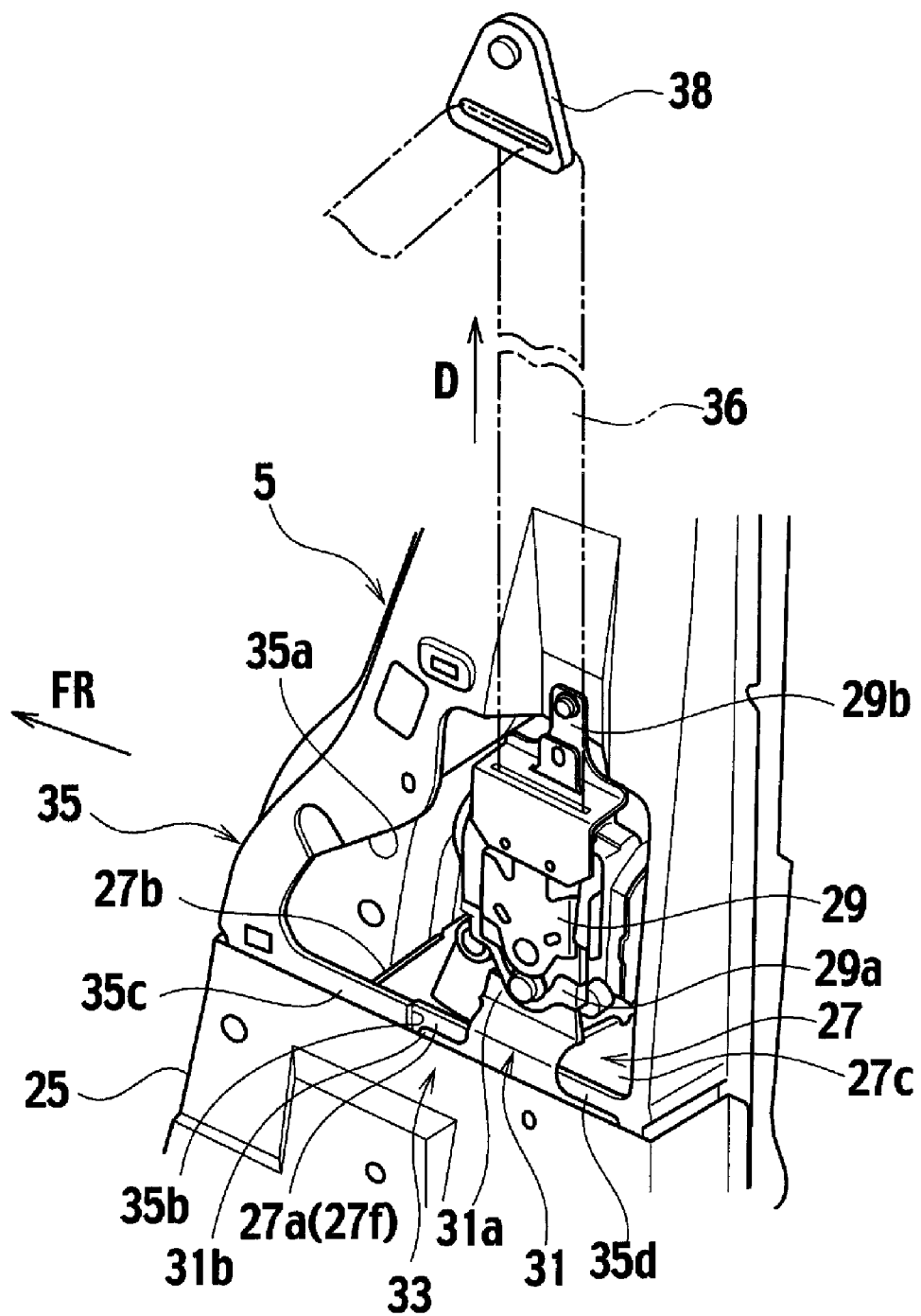
FIG. 5 is a similar view to FIG. 4 showing the upper inner panel and a seat belt retractor installed.

FIG. 5 shows a state in which the seat belt retractor 29 is attached to the mounting bracket 31 installed as shown in FIG. 4. FIG. 4 differs from FIG. 5 in that the seat belt retractor 29 and the upper inner panel 35 are removed. As mentioned before, the lower inner panel 25 and the upper inner panel 35 form the vehicle inner panel assembly.

With reference to FIG. 5, the upper inner panel 35 is formed with a panel opening 35a in which the seat belt retractor 29 is positioned viewing the opening 35a in a perpendicular fashion. With this position held, a lower tab 29a of the seat belt retractor 29 is attached to a tab 31a, which projects into the panel opening 35a from its edge, of the mounting bracket 31, and its upper tab 29b attached to the upper inner panel 35. After drawing a seat belt 36 out of the seat belt retractor 29 upwardly through the panel opening 35a, the seat belt 36 is turned down at a shoulder anchor 38. The shoulder anchor 38 is attached to the interior wall of the vehicle pillar 5 within the passenger compartment 23.

As shown in FIG. 3, the upper inner panel 35 is installed by inserting its lower edge into a gap between the upper edge of the lower inner panel 25 and the anchor plate 27a of the bracket 27. To set the before-mentioned catch 33, the upper inner panel 35 has a cutout 35b cut inwardly from its lower edge. The cutout 35b is positioned at a mid point between a fore end of the upper inner panel 35 and an aft end of the upper inner panel 35. At a portion facing this cutout 35b, the anchor plate 27a protrudes to form a protruding portion 27f. The catch 33 is formed by interposing a fore edge portion 31b of the mounting bracket 31 between the protruding portion 27f and the lower inner panel 25.

In the installed state, the mounting bracket 31 extends in a direction toward the rear of the vehicle body (in a leftward direction viewing in FIG. 3) from its fore edge portion 31b held at the catch 33.

The lower edge portion of the upper inner panel 35 is divided by the cutout 35b into a fore section 35c and an aft section 35d. The fore section 35c is positioned between the lower inner panel 25 and the anchor plate 27a of the bracket 27 and joined to them. The aft section 35d is interposed between the mounting bracket 31 and the anchor plate 27a of the bracket 27 and joined to the mounting bracket 31.

With reference to FIGS. 1 to 3, when a force is applied to the vehicle pillar 5, in particular the energy-input interface 7, in a direction indicated by an arrow B in FIG. 3 toward the passenger compartment 23 in the event of a side collision, the vehicle outer panel 15 and the pit-defining housing 17 receive impact load. The pit-defining housing 17 delivers the impact load from the flange 17a to the fore and aft sidewalls 17b and 17c for transmission of the impact load to the bracket 27.

During this situation, the bracket 27 efficiently receives transmission of the impact load, in directions indicated by arrows C in FIG. 3, from the fore and aft sidewalls 17b and 17c to the extension arms 27b and 27c, which are in parallel with and joined to the fore and aft sidewalls 17b and 17c, respectively. The impact load disperses over the whole of the vehicle pillar 5 by transmitting, via the anchor plate 27a, the impact load efficiently to the vehicle inner panel assembly that includes the lower and upper inner panels 25 and 35, preventing or at least minimizing deformation of the vehicle pillar 5.

In FIG. 3, a less preferred joint of a bracket 27 to the pit-defining housing 17 is shown in phantom. This less preferred joint is accomplished by placing and joining weld flanges continuous with terminal ends P of extension arms 27b and 27c to an end wall 17f of the pit-defining housing 17. To the contrary, according to the preferred embodiment, the bracket 27 is joined to the pit-defining housing 17 by interposing the sidewalls 17b and 17c between the extension arms 27b and 27c. As compared to the less preferred joint, the joint of the bracket 27 to the pit-defining housing 17 according to the preferred embodiment provides enhanced section modulus and thus enhanced torsional rigidity. Thus, the bracket 27 can efficiently transmit impact load from the pit-defining housing 17 to the vehicle inner panel assembly 25 and 35 due to the enhanced torsional rigidity derived from the enhanced section modulus of the joint.

According to the less preferred joint indicated in phantom in FIG. 3, the buckling of extension arms 27b and 27c is likely to occur when a force is applied in the direction as indicated by the arrow B in the event of a side collision because the terminal ends P are pressed by the end wall 17f. With this less preferred joint, the bracket 27 may be significantly deformed, making it difficult to carry out efficient transmission of impact load to the vehicle inner panel assembly 25 and 35.

The deformation of the pit-defining housing 17 is prevented or at least minimized because the pit-defining housing 17 enters the bracket 27 to absorb the impact during transmission of impact load to the bracket 27. Because the deformation of the pit-defining housing 17 is prevented or at least minimized, damages on the cap 21 and the fuel tube, not illustrated, are prevented or minimized.

With reference to FIG. 5, when a force draws and pulls the seat belt 36 in a direction indicated by an arrow D as a vehicle occupant within the passenger compartment 23 wears the seat belt 36, the seat belt retractor 29 acts on the mounting bracket 31 to deform it toward the passenger compartment 23 because this force has a horizontal force component directed toward the passenger compartment 23.

However, as compared to the case in which the mounting bracket 31 is joined only to the lower inner panel 25, the mounting bracket 31 is interposed between and joined to the lower inner panel 25 and the anchor plate 27a of the bracket 27 at the catch 33, making it possible to prevent the deformation of the mounting bracket 31 and detachment of it from the lower inner panel 25.

Because, according to the preferred embodiment, the effect of absorbing the impact load in the event of a side collision and the effect of preventing deformation of the mounting bracket 31 against pulling force applied to the seat belt 36 can be accomplished by a single bracket 27, manufacturing cost and weight can be reduced as compared to the case in which the above-mentioned effects are accomplished by separate parts.

Because, according to the preferred embodiment, the sidewalls 17b and 17c of the pit-defining housing 17 are in parallel with the respective extension arms 27b and 27c of the load-transferring bracket 27, the impact load is transmitted from the pit-defining housing 17 to the vehicle inner panel assembly 25 and 35 via the bracket 27.

Because, according to the preferred embodiment, the load-transferring bracket 27 comprises a pair of extension arms 27b and 27c extending away from the anchor plate 27a toward the pit-defining housing 17 and the extension arms 27b and 27c are joined to the respective sidewalls 17b and 17c of the pit-defining housing 17 at that area regions 27d and 27e which extend inwardly from the respective terminal ends 27bT and 27cT along the respective insides of the arms 27b and 27c, the load-transferring bracket 27 interposes the pit-defining housing 17 between the extension arms 27b and 27c, making it possible to carry out transmission of the impact load from the pit-defining housing 17 to the vehicle inner panel assembly 25 and 35 more efficiently in the event of a side collision.

Because, according to the preferred embodiment, the pit-defining housing 17 defines the pit 19 of the exterior surface of the vehicle body and the bottom 19a of the pit 19 is formed with the inlet port 19b, damages on the cap 21 and the fuel tube installed at the inlet port 19b can be minimized by preventing or at least minimizing deformation of the pit-defining housing 17 itself.

According to the preferred embodiment, the seat belt retractor 29 is positioned to lie within the panel opening 35a of the upper inner panel 35, and the tab 31a, which is used to mount the seat belt retractor 29, of the mounting bracket 31 extends into the panel opening 35a past the lower edge thereof from the mounting bracket 31 interposed between the lower inner panel 25 and the anchor plate 27a of the load-transferring bracket 27. When the seat belt 36 is pulled out of the retractor 29, the tab 31a is pulled toward the passenger compartment 23. During this situation, however, detachment of the mounting bracket 31 from the lower inner panel 25 and deformation of the mounting bracket 31 are prevented or at least minimized because the mounting bracket 31 is interposed between the anchor plate 27a of the load-transferring bracket 27 and the lower inner panel 25.

While the best mode for carrying out the invention has been described in detail, those familiar with the art to which this invention relates will recognize various alternative designs and embodiments for practicing the invention as defined by the following claims.

The present application claims the priority based on JP patent application No. 2007-232733, filed Sep. 7, 2007, whose content is hereby incorporated by reference in its entirety.

INDUSTRIAL APPLICABILITY

The present invention is applicable to fuel-powered or battery-powered or hybrid cars.

The invention claimed is:

1. A vehicle body comprising:
a vehicle pillar;
a vehicle inner panel assembly;
a pit-defining housing in the vehicle pillar in a spaced relationship with the vehicle inner panel assembly; and
a load-transferring element including an anchor plate attached to the vehicle inner panel assembly and arms extending away from the anchor plate, each of the arms being joined to one of sidewalls of the pit-defining housing at that area region which extends inwardly from a terminal end of the arm along an inside of the arm.

2. The vehicle body as claimed in claim 1, wherein the arms are in parallel with the sidewalls of the pit-defining housing, respectively.

3. The vehicle body as claimed in claim 1, wherein the arms are paired and two in number.

4. The vehicle body as claimed in claim 1, wherein the pit-defining housing is configured to define a pit including a bottom formed with an inlet port.

5. The vehicle body as claimed in claim 1, wherein a retractor mounting bracket is interposed between the vehicle inner panel assembly and the anchor plate of the load-transferring element, and a seat belt retractor is joined to the vehicle inner panel assembly via the retractor mounting bracket.

6. The vehicle body as claimed in claim 5, wherein the vehicle inner panel assembly is formed with a panel opening in which the seat belt retractor is positioned, and the retractor mounting bracket has a tab extending into the panel opening.

7. A vehicle body comprising:
a vehicle outer panel;
a vehicle inner panel assembly;
a pit-defining housing attached to the vehicle outer panel in a spaced relationship with the vehicle inner panel assembly; and
a load-transferring element including an anchor plate attached to the vehicle inner panel assembly and arms extending away from the anchor plate, each of the arms being joined to one of sidewalls of the pit-defining housing at that area region which extends inwardly from a terminal end of the arm along an inside of the arm.

* * * * *